US009207071B2

(12) United States Patent
Diefenderfer

(10) Patent No.: US 9,207,071 B2
(45) Date of Patent: Dec. 8, 2015

(54) ACCESSORY ADAPTER FOR LASER ALIGNMENT TOOL

(71) Applicant: Randy R. Diefenderfer, Rogersville, MO (US)

(72) Inventor: Randy R. Diefenderfer, Rogersville, MO (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 311 days.

(21) Appl. No.: 13/766,011

(22) Filed: Feb. 13, 2013

(65) Prior Publication Data
US 2014/0223750 A1 Aug. 14, 2014

(51) Int. Cl.
*G01B 11/27* (2006.01)

(52) U.S. Cl.
CPC .................... *G01B 11/272* (2013.01)

(58) Field of Classification Search
CPC ....... G01B 11/27; G01B 11/272; G01B 11/14
USPC ........... 33/227, 228, 286, 412, 533, 600, 645, 33/DIG. 1, DIG. 21
See application file for complete search history.

(56) References Cited

U.S. PATENT DOCUMENTS

| | | | |
|---|---|---|---|
| 2,659,824 A | 11/1953 | Burnham | |
| 3,707,883 A * | 1/1973 | Kamenick | ........................ 474/47 |
| 4,231,161 A | 11/1980 | Belfiore | |
| 4,249,294 A | 2/1981 | Belfiore | |
| 5,392,550 A | 2/1995 | Moore et al. | |
| D385,807 S | 11/1997 | Gruetzmacher | |
| 5,821,852 A | 10/1998 | Fairchild | |
| 5,987,762 A | 11/1999 | Toth et al. | |
| 6,031,616 A | 2/2000 | Seiffert | |
| 6,098,297 A | 8/2000 | Belfiore | |
| 6,173,502 B1 | 1/2001 | Scarborough | |
| 6,332,276 B1 | 12/2001 | Mangel | |
| 6,374,507 B1 | 4/2002 | Lehto | |
| 6,434,841 B1 | 8/2002 | Stahl et al. | |
| 6,519,866 B1 | 2/2003 | Gerdes | |
| 6,568,095 B2 | 5/2003 | Snyder | |
| 6,704,115 B1 | 3/2004 | Hamar | |
| 6,804,897 B1 | 10/2004 | Horn | |
| 6,825,923 B2 | 11/2004 | Hamar et al. | |
| 6,889,441 B2 | 5/2005 | Seiffert | |
| 6,968,625 B2 | 11/2005 | Segerström et al. | |
| 7,042,561 B1 | 5/2006 | Andersson | |
| 7,467,474 B1 | 12/2008 | Statham | |
| 7,845,084 B2 | 12/2010 | Statham | |
| D675,117 S | 1/2013 | Diefenderfer | |
| 2007/0271800 A1 | 11/2007 | Hersey et al. | |
| 2008/0276473 A1 | 11/2008 | Raschella et al. | |
| 2011/0094116 A1 | 4/2011 | Diefenderfer | |

* cited by examiner

*Primary Examiner* — R. A. Smith
(74) *Attorney, Agent, or Firm* — Thompson Hine LLP

(57) ABSTRACT

A pulley alignment apparatus is disclosed that includes a target component or a sighting component having a first contact surface shaped to detachably interface with a first pulley having a first diameter. The apparatus further includes an adaptor with a second contact surface shaped to detachably interface with a second pulley having a second diameter and a receiving surface shaped to detachably interface with the first contact surface of the target component or the sighting component. The target component or the sighting component is seated on the adaptor with the first contact surface detachably interfaced with the receiving surface of the adaptor, and the first diameter and the second diameter are different.

24 Claims, 9 Drawing Sheets

ACCESSORY ADAPTER FOR LASER ALIGNMENT TOOL

FIELD

The present patent application relates to accessory adaptors for a pulley alignment tool, systems, and methods, and, more particularly, to apparatuses, systems, methods, and kits for aligning pulleys in a belt and pulley system.

BACKGROUND

A belt and pulley system typically includes a belt and at least two pulleys, wherein each pulley is rotatable about an associated rotational axis. The belt is engaged with both pulleys, thereby transferring rotational power from one pulley to the other. For example, in an automotive application, rotational power from the crankshaft may be transferred to various systems, such as the power steering system, the alternator and the air conditioning compressor, by way of a belt and pulley system.

Misalignment of pulleys in a belt and pulley system has been known to result in increased system noise, excessive belt wear, unnecessary loads on the pulleys, and unintentional displacement of the belt during operation. Pulley misalignment occurs when one or more pulleys in the belt and pulley system is axially and/or angularly displaced from the other pulleys in the system. In the automotive application, misalignment occurs when one or more pulleys is axially and/or angularly displaced from the pulley associated with the crankshaft. Thus, the crankshaft pulley is typically used as the primary reference point in alignment of other pulleys in the belt and pulley system, for example with a laser beam alignment system. Using the crankshaft as a primary reference point is not always possible, however, because obstructions may block the path of the alignment beam. The current invention overcomes this problem by modifying the location of the source of the alignment beam of a pulley alignment system to facilitate the use of the system for the alignment of pulleys that would otherwise pose a problem due to obstruction of the alignment beam path. The current invention also allows for the use of an adaptor with the pulley alignment system to facilitate the system's use with pulleys of various diameters (e.g., the alternator pulley, which is typically very small compared to a crankshaft pulley) that would otherwise be incompatible with the components of the unmodified pulley alignment system.

Accordingly, those skilled in the art continue to seek techniques for quickly and accurately gauging of the alignment of the pulleys in a belt and pulley system.

SUMMARY

In one aspect, a pulley alignment apparatus is disclosed that includes a target component or a sighting component having a first contact surface shaped to detachably interface with a first pulley having a first diameter. The apparatus further includes an adaptor with a second contact surface shaped to detachably interface with a second pulley having a second diameter and a receiving surface shaped to detachably interface with the first contact surface of the target component or the sighting component. The target component or the sighting component is seated on the adaptor with the first contact surface detachably interfaced with the receiving surface of the adaptor, and the first diameter and the second diameter are different.

In another aspect, an adaptor for a pulley alignment apparatus is disclosed that includes an elongated body having two elongate, opposing sides and a receiving surface extending between the two elongate, opposing sides. The receiving surface has an at least partially female receptacle, as well as a first retaining mechanism for detachably connecting a component of the pulley alignment apparatus thereto with a male member received in the at least partially female receptacle. The adaptor also has a mounting surface opposite the receiving surface, the mounting surface including legs mateable to an arcuate surface of a pulley and a second retaining mechanism to detachably connect the adaptor to the pulley.

In yet another aspect, a pulley alignment kit is disclosed including a target component detachably connectable to a first pulley, one or more adaptors each detachably connectable to pulleys of different diameters, and a sighting component independently connectable to a second pulley and connectable to each of the one or more adaptors. The sighting component includes a laser and a first retaining mechanism positioned therein to detachably affix the sighting component to a second pulley or to the adaptor. Each adaptor has a contact surface shaped to detachably interface with a pulley of a pre-selected diameter and a receiving surface shaped to detachably interface with the target component, the sighting component, or both the target component and the sighting component.

In still another aspect, a pulley alignment apparatus is disclosed including a target component and a sighting component both having a first contact surface shaped to detachably interface with a first pulley having a first diameter and an adaptor having a second contact surface shaped to detachably interface with a second pulley having a second diameter and a receiving surface detachably interfaced with the target component or the sighting component. The target component or the sighting component is seated on the adaptor, with the first contact surface detachably interfaced with the receiving surface of the adaptor as an alternative to being seated on the first pulley.

Other aspects of the disclosed pulley alignment apparatus, system, kit, and method will become apparent from the following description, the accompanying drawings, and the appended claims.

DETAILED DESCRIPTION

Figure 1:
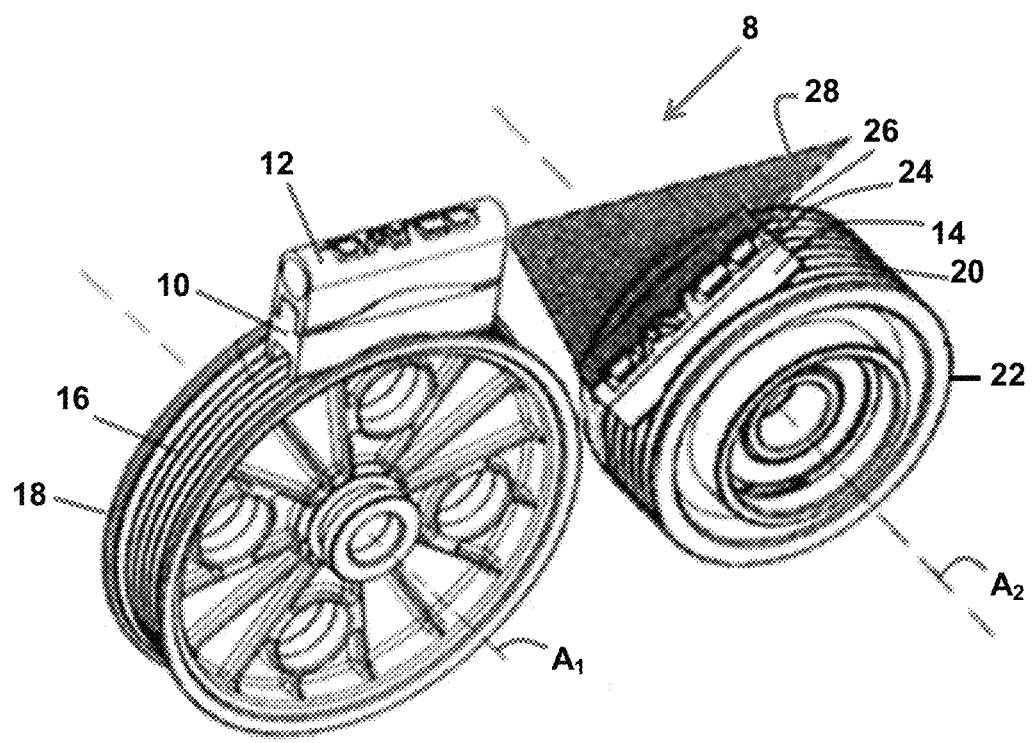
FIG. 1 is a perspective view of one aspect of the disclosed pulley alignment system, which includes a sighting component, a target component, and an adaptor.

Referring now to the embodiment shown in FIG. 1, a pulley alignment system, generally designated 8, is shown that includes an adaptor 10, a sighting component 12, and a target component 14. Adaptor 10 may be positioned to detachably interface with an arcuate belt engaging surface 16 of a first pulley 18, which may be mounted for rotation about a first rotational axis $A_1$. Sighting component 12 may be positioned to detachably interface with adaptor 10 such that sighting component 12 is seated upon adaptor 10. Target component 14 may be positioned to detachably interface with an arcuate belt engaging surface 20 of a second pulley 22, which may be mounted for rotation about a first rotational axis $A_2$. Pulleys 18, 22 may have the same or different diameters, and as used in this disclosure, pulleys 18, 22 refer to the relative positioning of any two pulleys to be monitored for alignment, and pulleys 18, 22 do not necessarily refer to pulleys of a certain size or function. Further, a reference to pulley 18, 22 need not refer to the same pulley throughout this disclosure (i.e. it is not inconsistent with this disclosure for sighting component 12 to fit pulley 18 in one instance, but not fit pulley 18 in a second instance, thus requiring adaptor 10 which does fit pulley 18 in the second instance).

In an alternative embodiment (not depicted), adaptor 10 may be positioned on belt engaging surface 20 of second pulley 22 instead of belt engaging surface 16 of first pulley 18. In this embodiment, sighting component 12 may be positioned to detachably interface with first pulley 18 directly, and target component 14 may be positioned to detachably interface with adaptor 10 such that target component 14 is seated upon adaptor 10. In another alternative embodiment, both sighting component 12 and target component 14 may each be seated upon adaptors 10.

Target component 14 may be provided with indicia 24 that identifies a target 26, such as a line or company logo, on target component 14. Sighting component 12 may project a beam 28, which may be a single laser point or multiple laser points (e.g., a line), onto the target component 14.

Thus, a user may determine whether second pulley 22 is axially displaced from first pulley 18 by examining beam 28 and determining whether projected beam 28 is axially displaced from target 26. If axial displacement is discovered, the user may either adjust the axial position of first pulley 18 along rotational axis $A_1$ and/or the axial position of second pulley 22 along rotational axis $A_2$ until precise alignment of first and second pulleys 18, 22 is achieved.

Figure 2:
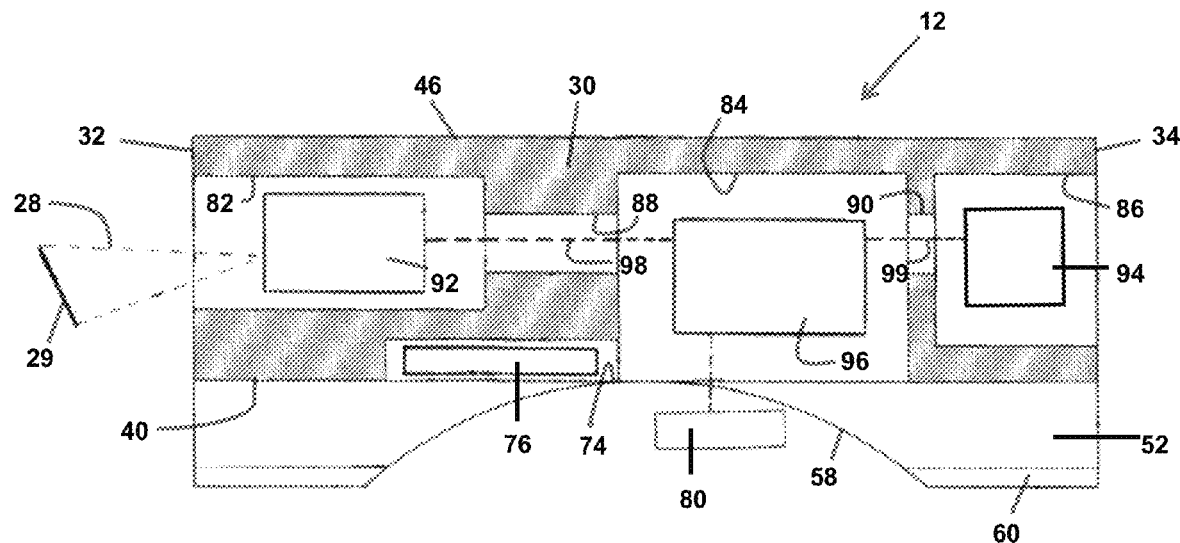
FIG. 2 is a side elevational view, in section, of one embodiment of a sighting component of the pulley alignment system.

Furthermore, a user may determine whether first and second pulleys 18, 22 are pitched at an angle relative to their associated rotational axes $A_1$, $A_2$ by projecting beam 28 as a laser line 29, identified in FIG. 2, and examining the laser line to determine whether it is parallel with target 26 or disposed at an angle relative to target 26. For example, when target 26 is a line and when one pulley 18, 22 is not perpendicular to its associated rotational axis $A_1$, $A_2$, laser line 29 may intersect target line 26 to define an angle therebetween, signaling a need to realign pulleys 18, 22.

Figure 3:
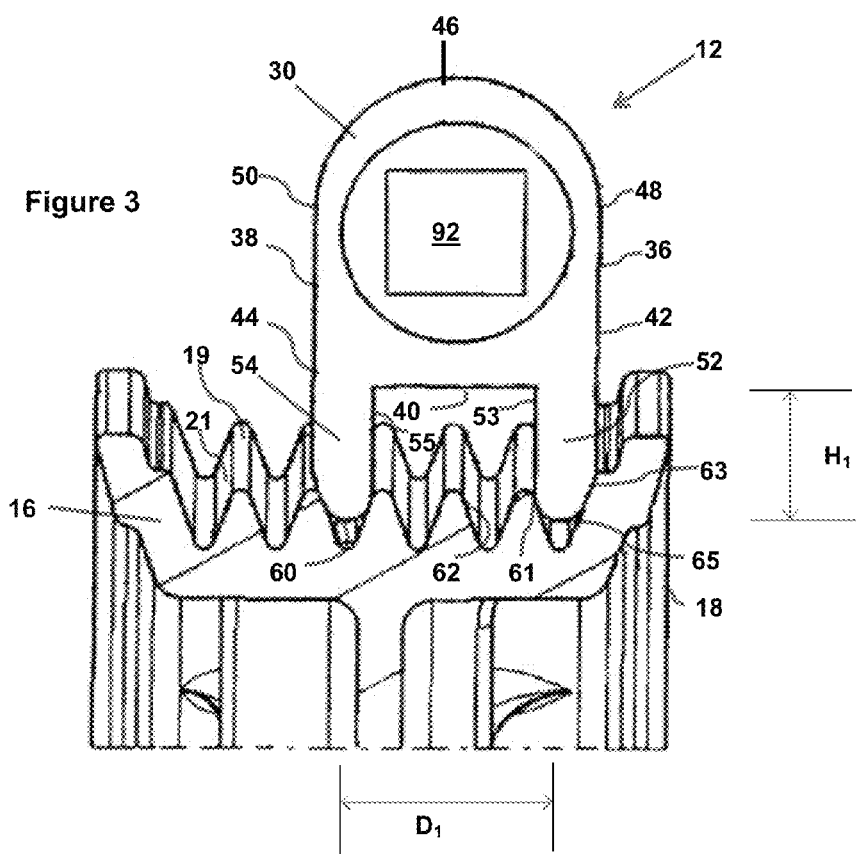
FIG. 3 is an end elevational view, in section, of the sighting component of the pulley alignment system of FIG. 1 mounted directly on a pulley's belt engaging surface without the adaptor therebetween.

Now referring to FIGS. 2 and 3, sighting component 12 of pulley alignment system 8 may include an elongated body 30 having a leading end 32, a trailing end 34, side walls 36, 38, a mounting surface 40 extending between a first end 42 of side wall 36 and a first end 44 of side wall 38, and an upper surface 46 extending between a second end 48 of side wall 36 and a second end 50 of side wall 38. A pair of legs 52, 54 may extend outward from, and generally perpendicular to, mounting surface 40. Mounting surface 40 may be located on the underside (pulley side) of body 30 between inseam surfaces 53, 55 of legs 52, 54. Legs 52, 54 may be generally parallel to each other.

As shown in FIG. 3, each leg 52, 54 may terminate at a rounded tip 60. Rounded tip 60 may be sized and shaped to be received between ribs 62 of pulley 18. For example, rounded tip 60 may have a diameter of about 2.5 millimeters to correspond with the ribs 62 of pulley 18 manufactured in accordance with SAE standard J1459. Rounded tip 60 may have other larger or smaller diameters, as would be appreciated by one skilled in the art, for use with a pulley 18 with ribs 62 of various dimensions. In one embodiment, rounded tip 60 may be shaped to have a rounded side 61, a beveled side 63, and a rounded end 65 therebetween.

As shown in FIG. 2, legs 52, 54 may extend all or a substantial portion of the length of body 30, and may define an arch 58 therein. Arch 58 in each leg 52, 54 may be centered relative to body 30, and may be sized and shaped to correspond with the contour of an associated pulley 18 with a specific diameter (see FIG. 1).

Referring again to FIG. 3, legs 52, 54 may be spaced apart from each other by a distance $D_1$, which may be measured as the distance from tip 60 of leg 52 to tip 60 of leg 54, and may have a height $H_1$, which may be measured from mounting surface 40 of body 30 to tip 60 of each leg 52, 54. In one aspect, the distance $D_1$ may be a multiple of 3.56 millimeters (e.g., $D_1$=N*3.56 millimeters, wherein N is a positive integer) such that sighting component 12 may be mounted on a pulley 18 manufactured in accordance with SAE standard J1459, which specifies a nominal rib pitch of 3.56 millimeters. In one specific example, distance $D_1$ may be about 10.68 millimeters (N=3) on which sighting component 12 is to be received. Alternatively, legs 52, 54 of sighting component 12 may be constructed to engage adaptor 10. The rounded tip 60 may have different diameters depending upon the pulley for which it is suited to seat upon, for example a J-section pulley or an L-section pulley. Moreover, the pitch between the legs 52, 54 can vary as well to change the sighting component's ability to fit a respective pulley.

Referring back to FIG. 2, body 30 may be a solid body and may define a laser compartment 82, a switch compartment 84, a battery compartment 86 and a magnet compartment 74 therein. A first channel 88 may provide communication between laser compartment 82 and switch compartment 84, and a second channel 90 may provide communication between switch compartment 84 and battery compartment 86. Laser compartment 82 may be recessed into body 30 from the leading end 32 of body 30. Battery compartment 86 may be accessed through the trailing end 34 of body 30. Magnet compartment 74 may be recessed into body 30 from mounting surface 40 of body 30.

A laser 92 may be received in laser compartment 82 and may project beam 28 outward from the leading end 32 of body 30. Laser 92 may be any device capable of projecting beam 28 onto target component 14. In one aspect, as shown in FIGS. 1 and 2, beam 28 may be a planar beam and may be projected onto target component 14 as a line 29 through a generally vertical plane, thereby limiting or eliminating the problems associated with laser beam diffraction due to the rounded tips 19 and angular flank 21 of the ribs 62 of the pulley 18. In another aspect, beam 28 may be projected onto target component 14 as a single point (not shown) or multiple points, which may or may not be in a line. For example, laser 92 may be the LASIRIS™ reduced speckle line generator available from StockerYale, Inc. of Salem, N.H. As another example, laser 92 may be a 650 nm, 5 MW red laser line module available from Instapark.

Laser 92 may be electrically powered by a power supply 94 received in battery compartment 86. Power supply 94 may be any appropriate source of electrical energy. In one exemplary aspect, power supply 94 may be a battery, such as a disposable or rechargeable battery (e.g., a AA battery).

A switch 96 may be received in switch compartment 84 and may selectively electrically couple laser 92 to power supply 94. Electrical lines 98, 99 may extend through channels 88, 90 to electrically couple laser 92 to switch 96 and switch 96 to power supply 94.

Figure 9:
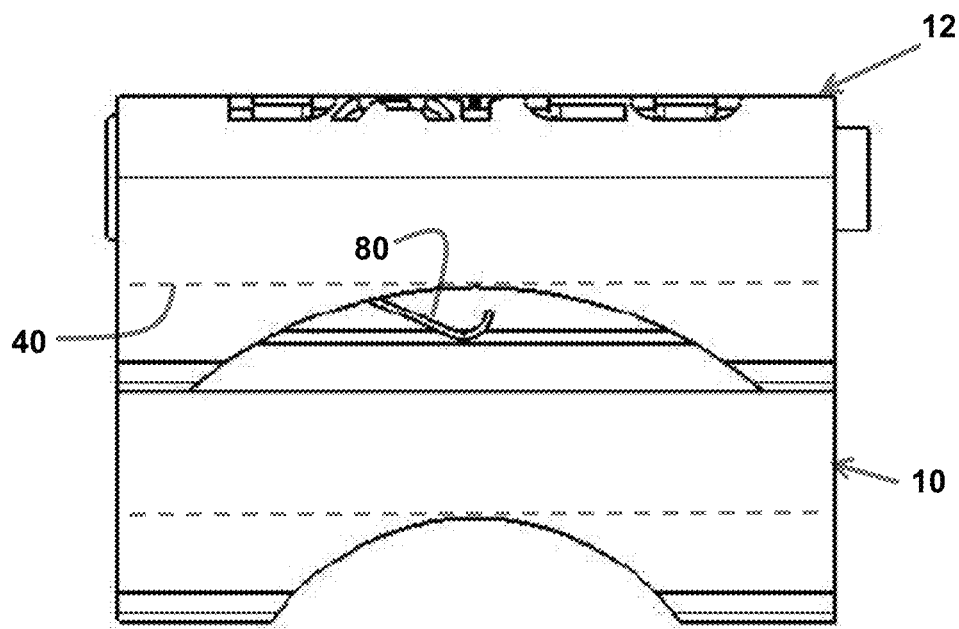
FIGS. 9 and 9A are side views of various embodiments of a sighting component mounted on an adaptor.

Switch 96 may be a normally open, push-to-make-contact switch, and may include an activator 80 disposed proximate to mounting surface 40. Switch 96 may be configured to detect the presence of belt engaging surface 16 of first pulley 18, such that when belt engaging surface 16 is detected, switch 96 is closed to power laser 92. Switch 96 or activator 80 may also be configured to detect the presence of adaptor 10 (see FIG. 9), such that seating sighting component 12 on either pulley 18 or adaptor 10 is sufficient to activate switch 96. In one particular aspect, switch 96 or activator 80 may be a spring-loaded plunger or finger that is displaced by engagement with adaptor 10 when sighting component 12 is mounted on pulley 18 or adaptor 10. For example, switch 96 may be a submini SPST lever switch available from Radio Shack.

A retaining mechanism 76 may be received in magnet compartment 74 proximate mounting surface 40. As used herein, "proximate" means "at" or "close to." Retaining mechanism 76 may be securely connected to body 30 and may assist in retaining sighting component 12 on pulley 18 or adaptor 10. Therefore, retaining mechanism 76 may be a device or material that retains, whether securely or only slightly, sighting component 12 relative to belt engaging surface 16 of first pulley 18 or to adaptor 10. In one exemplary aspect, retaining mechanism 76 may be a magnet. In an alternative aspect, retaining mechanism 76 may be a tacky adhesive, tape material, a latch or latches, or hook/slot connectors.

Figure 4:
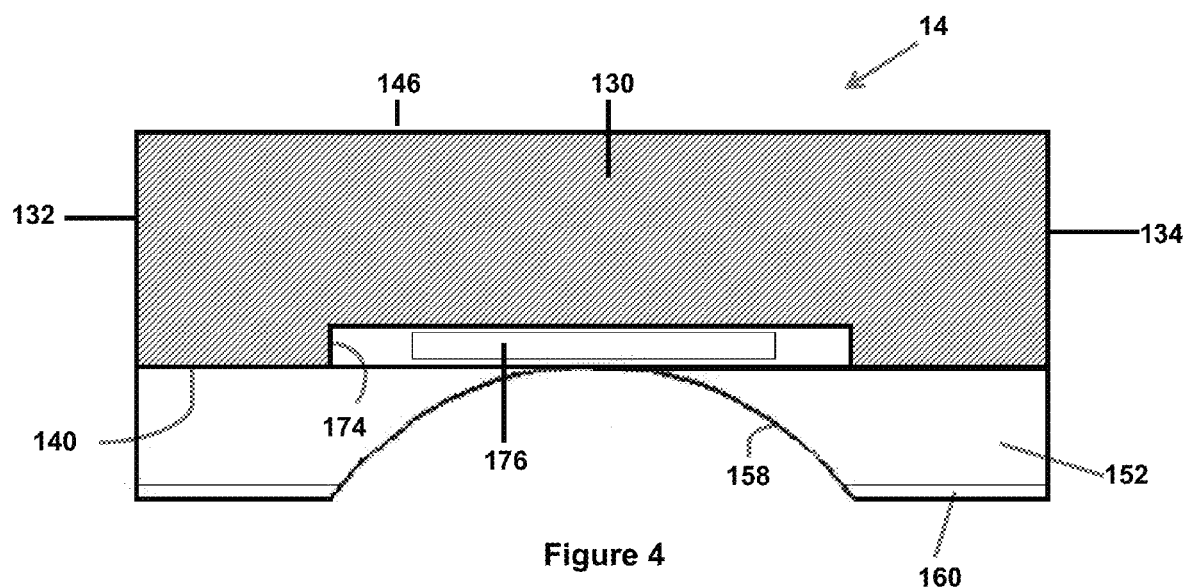
FIG. 4 is a side elevational view, in section, of the target component of the pulley alignment system of FIG. 1.
Figure 5:
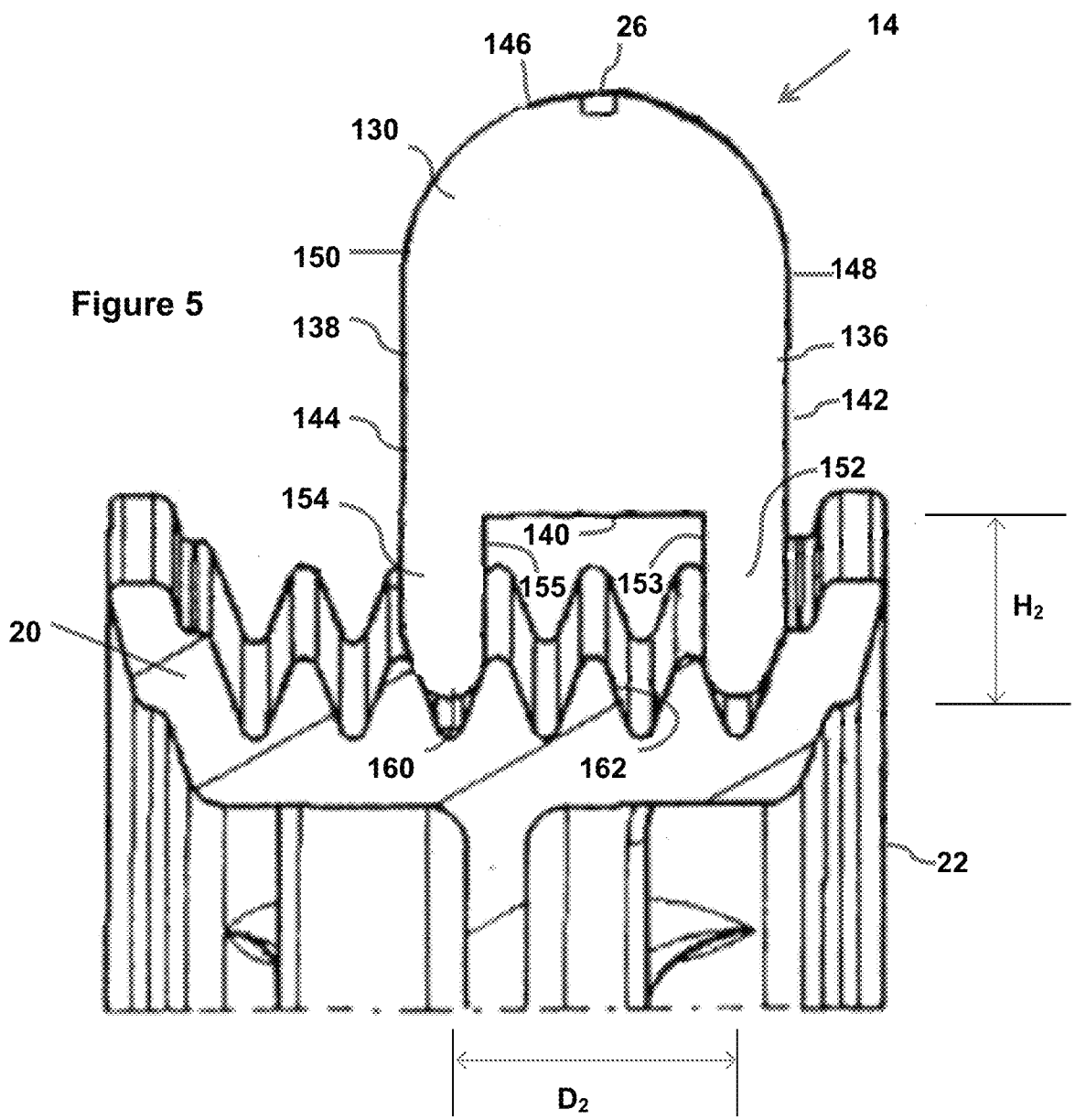
FIG. 5 is an end elevational view, in section, of the target component of the pulley alignment system of FIG. 1.

Referring now to FIGS. 4 and 5, target component 14 of pulley alignment system 8 may include an elongated body 130 having a first end 132, a second end 134, side walls 136, 138, a mounting surface 140 extending between the first end 142 of side wall 136 and the first end 144 of side wall 138, and an outer surface 146 extending between the second end 148 of side wall 136 and the second end 150 of side wall 138. A pair of legs 152, 154 may extend downward from, and generally perpendicular to, mounting surface 140. Mounting surface 140 may be located on the underside (pulley side) of body 130 between inseam surfaces 153, 155 of legs 152, 154. Legs 152, 154 may be generally parallel to each other.

Legs 152, 154 of the target component 14 may be constructed to engage ribs 162 of belt engaging surface 20 of second pulley 22. Therefore, legs 152, 154 of target component 14 may be sized, shaped, and dimensioned in a manner similar to legs 52, 54 of sighting component 12. Thus, legs 152, 154 of target component 14 may be spaced apart from each other by a distance $D_2$, and may have a height $H_2$, each of which may be calculated in the same manner as distance $D_1$ and height $H_1$ of legs 52, 54 of sighting component 12. Alternatively, legs 152, 154 of target component 14 may be constructed to engage adaptor 10.

Body 130 of target component 14 may be a solid body and may define a magnet compartment 174 therein. The magnet compartment 174 may be recessed into body 130 from mounting surface 140 of body 130. A retaining mechanism 176 may be received in magnet compartment 174 and may be securely connected to body 130 to assist in retaining target component 14 on second pulley 22 or adaptor 10. Retaining mechanism 176 may be a magnet or other device or material that retains, whether securely or only slightly, target component 14 relative to second pulley 22 or adaptor 10, by the same or similar methods as those discussed above in connection with retaining mechanism 76 of sighting component 12.

Adaptor 10 may be interposed between sighting component 12 and first pulley 18 (as seen in FIG. 1), between target component 14 and second pulley 22, or between both of these components 12, 14 and their associated pulleys 18, 22. Adaptor 10 may be so utilized where, for instance, an obstruction (not shown) exists between sighting component 12 and target component 14 that would otherwise prevent beam 28 from projecting upon target 26, but where repositioning with the added height of adaptor 10 would overcome the obstruction. Adaptor 10 may also be utilized to facilitate the attachment of sighting component 12 and/or target component 14 to its associated pulley 18, 22 where one or both of these components 12, 14 is incompatible with belt engaging surface 16, 20 of its associated pulley 18, 22, but where adaptor 10 is compatible with the otherwise-incompatible pulley 18, 22. One skilled in the art will appreciate other scenarios where the inclusion of adaptor 10 within pulley alignment system 8 may be beneficial, and that there are a multitude of mechanisms by which an adaptor 10 (or sighting component 12 or target component 14) may detachably interface with pulley 18, 22. While this disclosure focuses upon one particular family of such interfaces (i.e. components with legs that engage pulley teeth, coupled with a retaining mechanism), the underlying inventive concept may be applied to any pulley interfacing system, so long as adaptor 10 can: 1) interface with a pulley and 2) serve as a secure seat for a sighting component and/or targeting component that, itself, was designed for connection directly to a pulley. In one embodiment, the pulley having a single groove for engaging a belt.

Figure 6:
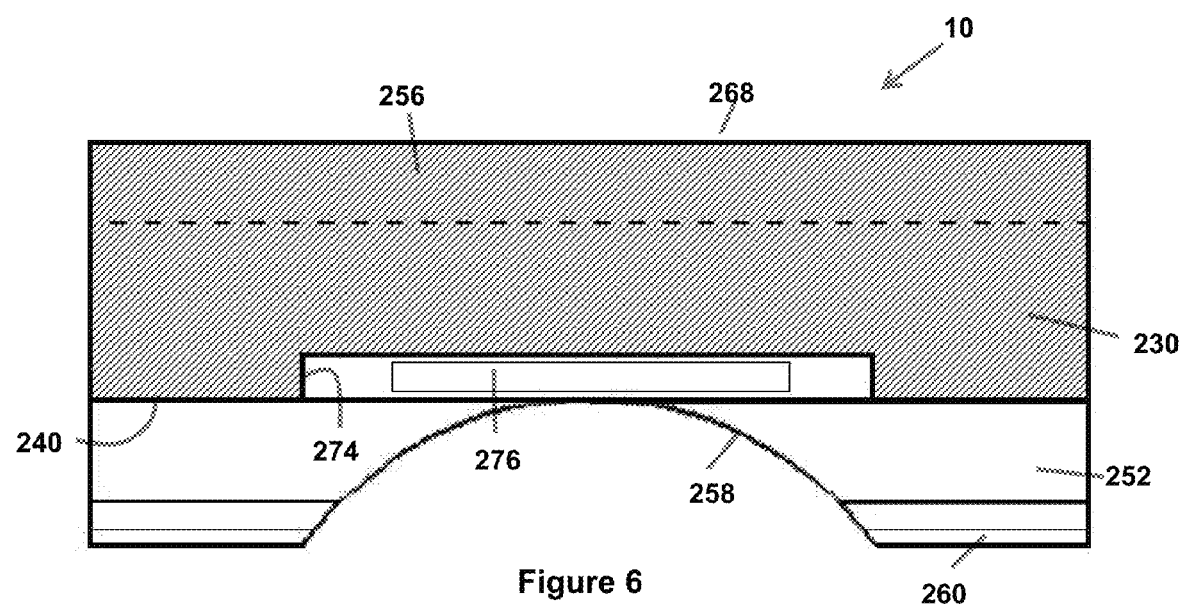
FIGS. 6 and 6A are side elevational views, in section, of various embodiments of an adaptor.
Figure 7:
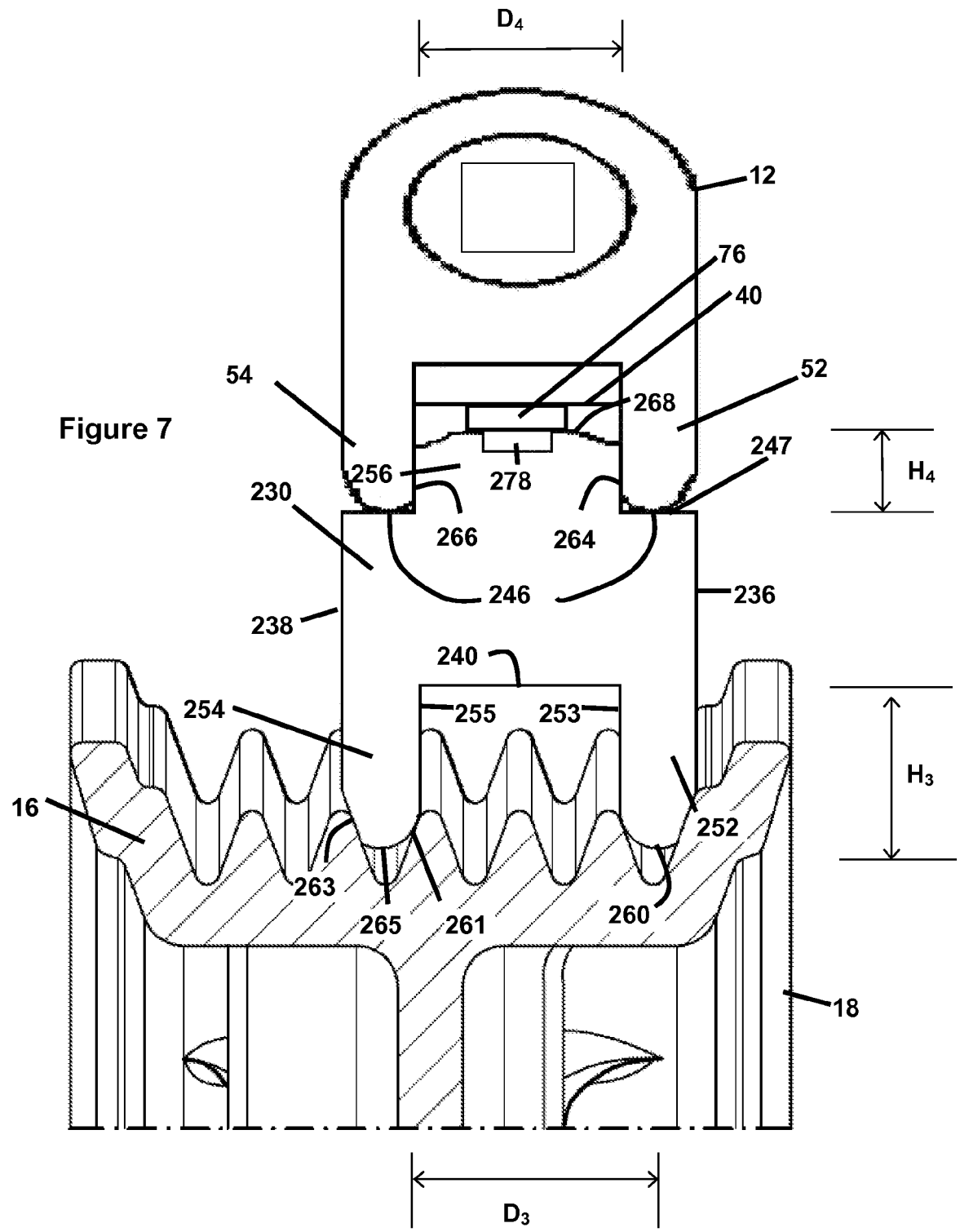
FIG. 7 is an end elevational view, in section, of the adaptor and the sighting component of the pulley alignment system of FIG. 1.

Now referring to FIGS. 6 and 7, adaptor 10 of pulley alignment system 8 includes an elongated body 230 having two elongate, opposing sides 236, 238, at least two legs 252, 254 extending downward from body 230 and generally parallel to each other, and a head 256 which may extend upward from body 230 and away from legs 252, 254. A mounting surface 240 may be located on the underside (pulley side) of body 230 between inseam surfaces 253, 255 of legs 252, 254. In most respects, the basic structures of adaptor 10 are analogous to those features of sighting component 12 and target component 14 that the three parts share in common. Therefore, aspects of these analogous structures that are not specifically discussed below with respect to adaptor 10 may nonetheless be included in adaptor 10, and aspects of adaptor 10 that are discussed only below may similarly be included in sighting component 12 and target component 14.

Legs 252, 254 of adaptor 10 may be sized, shaped, and dimensioned in a manner similar to legs 52, 54 of sighting component 12 and legs 152, 154 of target component 14 to detachably interface with belt engaging surface 16 of pulley 18 or belt engaging surface 20 of pulley 22. Thus, legs 252, 254 may be spaced apart from each other by a distance $D_3$, which may be measured as the distance from the tip 260 of leg 252 to the tip 260 of leg 254, and may have a height $H_3$, which may be measured from the mounting surface 240 of the body 230 to the tip 260 of either leg 252, 254. In one aspect, distance $D_3$ may be a multiple of 3.56 millimeters (e.g., $D_3=N*3.56$ millimeters, wherein N is a positive integer) such that the adaptor 10 may be mounted on a pulley 18, 22 manufactured in accordance with SAE standard J1459, which specifies a nominal rib pitch of 3.56 millimeters. In one specific example, the distance $D_3$ may be about 10.68 millimeters (N=3). The pitch between the legs 152, 154 can vary as well to change the target component's ability to fit a respective pulley.

In one embodiment, rounded tip 260 may be sized and shaped to be received between ribs 62 of first pulley 18. In an alternative embodiment, the rounded tip 260 may be sized and shaped to be received between ribs 162 of second pulley 22 (not shown). For example, rounded tip 260 may have a diameter of about 2.5 millimeters to correspond with the ribs 62, 162 of pulley 18, 22 manufactured in accordance with SAE standard J1459. In one embodiment, rounded tip 260 may be shaped to have a rounded side 261, a beveled side 263, and a rounded end 265 therebetween. A variety of adaptors 10 with tips 260 with different dimensions or spacing schemes that correspond with a variety of standard and non-standard pulleys may be provided in a kit. For example, a first adaptor may be dimensioned to fit pulleys having a J section configuration and a second adaptor may be dimensioned to fit an L section configuration. In one embodiment, the rounded tips 60 may have different diameters depending upon the pulley for which it is suited to seat upon.

Legs 252, 254 may extend the entire length of elongate body 230, and may define an arch 258 therein. Arch 258 may be centered relative to the body 230. Further, arch 258 may be sized and shaped to correspond to the contour of pulley 18, 22. Thus, arch 258 of adaptor 10 may be smaller or larger than arch 58 of sighting component 12 or arch 158 of target component 14, thereby facilitating the use of sighting component 12 or target component 14 with a pulley 18, 22 which would otherwise be incompatible with the primary component 12, 14 in the absence of adaptor 10. A variety of adaptors 10 with arches 258 of varying size may be provided in a kit for use with a wide variety of pulleys. As will be appreciated by one skilled in the art, legs 252, 254 represent just one form of contact surface between adaptor 10 and pulley 18, 22, and adaptor 10 may detachably interface with pulley 18, 22 in a wide variety of alternative fashions without departing from the spirit of this disclosure.

Head 256 may be elongate like body 230 and may extend the full length or along only a portion thereof. Head 256 may not be as wide as body 230, and as such two shoulders 246 may be present as an upper surface of body 230 adjacent to head 256 and on either side of head 256. If head 256 is centered upon body 230, shoulders 246 may be generally equal in size and shape, but head 256 need not be centered. Head 256 may define a pair of walls 264, 266 and an upper surface 268 therebetween that may take any of a variety of shapes, including domed or flat.

Walls 264, 266 and upper surface 268 of head 256 and shoulders 246 of body 230 may be configured, independently or in conjunction with each other, to define a receiving surface 247 upon which sighting component 12 and/or target component 14 may be seated. While this seating interaction is described below and depicted in the figures with respect to sighting component 12, one skilled in the art will appreciate that the features and interactions disclosed are equally applicable to the analogous portions of target component 14 for an embodiment where target component 14 may be seated upon adaptor 10 instead of sighting component 12.

Still referring to FIG. 7, walls 264, 266 of head 256 may be spaced apart from each other by a distance $D_4$, which may be measured as the distance between walls 264, 266, and may have a height $H_4$, which may be measured as the distance between shoulders 246 of body 230 and upper surface 268 of head 256. In one embodiment, distance $D_4$ and height $H_4$ may be configured such that legs 52, 54 of sighting component 12 may detachably interface with receiving surface 247 of adaptor 10.

Shoulders 246 and head 256 may form a partially female receptacle to receive legs 52, 54. Legs 52, 54 may simultaneously contact both walls 264, 266 and both shoulders 246 such that tips 60 of legs 52, 54 contact shoulders 246. In another embodiment, tips 60 of legs 52, 54 may not contact shoulders 246 if, for example, height $H_4$ of walls 264, 266 is greater than the length of legs 52, 56, or if friction between legs 52, 54 and walls 264, 266 prevents such contact (for example, if distance $D_4$ is non-uniform to establish an interference fit between legs 52, 54 and walls 264, 266). In yet another embodiment, tips 60 of legs 52, 54 and mounting surface 40 of sighting component 12 may contact shoulders 246 and upper surface 268 of adaptor 10, but one or both of legs 52, 54 may not contact walls 264, 266. As will be appreciated by one skilled in the art, other permutations of these contact surface arrangements may define receiving surface 247 (and thus the precise seating arrangement of sighting component 12 upon adaptor 10), and all are contemplated by this disclosure so long as the detachable interface between sighting component 12 and adaptor 10 is sufficiently secure to accurately evaluate the alignment between pulleys 18, 22.

Referring back to FIG. 6, the body 230 of adaptor 10 may be a solid body and may define a magnet compartment 274 therein. Magnet compartment 274 may be recessed into body 230 from mounting surface 240 of the body 230. A first retaining mechanism 276 may be received in magnet compartment 274 and securely connected to body 230 to assist in retaining adaptor 10 on first or second pulley 18, 22. First retaining mechanism 276 may be a device or material to detachably affix, whether securely or only slightly, the adaptor 10 relative to a contact surface such as belt engagement surface 16, 20 of first or second pulley 18, 22. In one exemplary aspect, first retaining mechanism 276 may be a magnet. In an alternative aspect, first retaining mechanism 276 may be a tacky adhesive or tape material.

Figure 8:
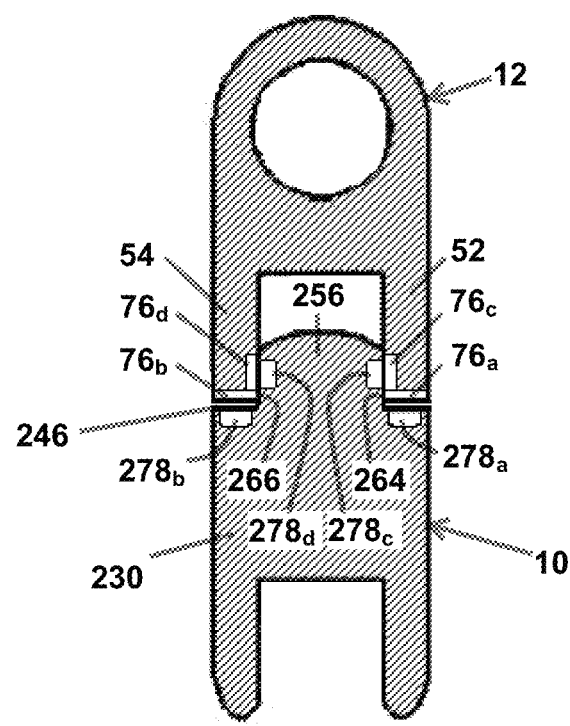
FIG. 8 is a side elevational view, in section, of one embodiment of an adaptor having a sighting component mounted thereon.

As shown in FIG. 7, a second retaining member 278 may be received in head 256 of adaptor 10, disposed proximate to upper surface 268, to ensure that sighting component 12 is securely seated upon adaptor 10. Second retaining member 278 may be positioned anywhere within adaptor 10 such that it facilitates the securely detachably affixed to sighting component 12. If retaining mechanism 76 of sighting component 12 is a magnet, second retaining member 278 of adaptor 10 may be a ferrous material strip. Alternatively, second retaining member 278 may be any other device or material that retains, whether securely or only slightly, sighting component 12 relative to adaptor 10. FIG. 8 depicts a variety of potential placement sites of second retaining member $278_{a-d}$ that correspond with potential placement sites of retaining mechanism $76_{a-d}$ (that is, if mating features are required by virtue of the form of retention mechanism used such as magnets, hook and loop fasteners, snaps, or other mechanical attachment devices) of sighting component 12.

Figure 6A:
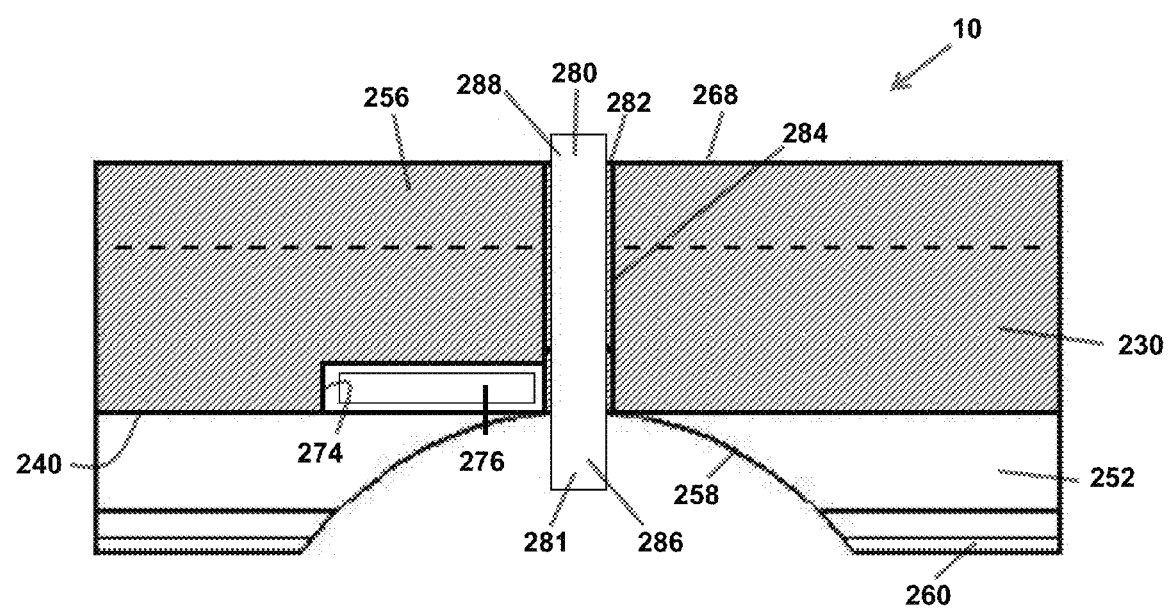
Figure 9A:
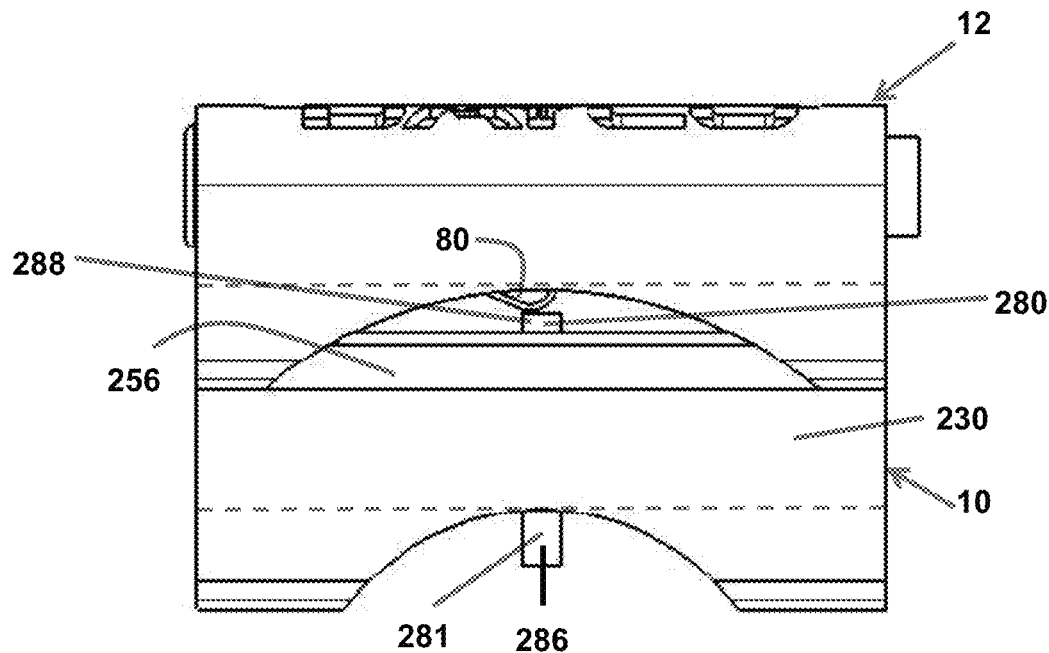

Referring now to FIGS. 6A, and 9A, adaptor 10 may include a secondary activator 280. Secondary activator 280 may interface and function in conjunction with activator 80 of sighting component 12 to activate switch 96 to power laser 92, or secondary activator 280 may contact switch 96 directly. In one embodiment, adaptor 10 may include a bore 282 defining a channel 284 (FIG. 6A) through body 230 and head 256, and secondary activator 280 may be rod 281, which may be disposed moveably within channel 284, and which may have a pulley-side protruding end 286 ("first end" 286)) and a receiving surface-side protruding end 288 ("second end" 288).

Rod 281 may be moveable between an unengaged position, where second end 288 of rod 281 does not contact activator 80 or switch 96 of sighting component 12, and thus laser 92 is powered off, and a pulley-engaged position where second end 288 of rod 281 contacts activator 80 or switch 96 of sighting component 12, and thus laser 92 is powered on. Rod 281 may be disposed within bore 282 or channel 284 such that when adaptor 10 is in the unengaged position (and therefore detached from pulley 18, 22), first end 286 protrudes from body 230 downward (pulley-ward) beyond the curvature of arch 258 and second end 288 does not contact activator 80 or switch 96 of sighting component 12, even if sighting component 12 is seated upon adaptor 10. When adaptor 10 is subsequently seated upon pulley 18, 22, belt engaging surface 16, 20 of pulley 18, 22 contacts first end 286 of rod 281, displacing rod 281 within channel 284 and transitioning rod 281 into the pulley-engaged position, thus powering on laser 92 as previously described.

One skilled in the art will appreciate that secondary activator 280 may be any device or system with the capacity to differentiate between a sighting component 12/adaptor 10 complex seated on pulley 18, 22 and a sighting component 12/adaptor 10 complex separated from pulley 18, 22 to ensure that a signal to activate laser 92 is transmitted only when the sighting component 12/adaptor 10 complex is seated upon pulley 18, 22, and that moveable rod 281 is merely one such example. For instance, instead of rod 281, legs 252, 254 of adaptor 10 may include a sensor (not shown) to detect the presence of pulley 18, 22 to trigger a pop-up button (not shown) on receiving surface 247 that "pops up" to contact activator 80 or switch 96 of sighting component 12 only when pulley 18, 22 is detected by the sensor. One skilled in the art will appreciate that the signal transmission may be fully mechanical in nature (as in the embodiment including rod 281), fully electronic in nature, or a combination of the two (as in the sensor embodiment).

Figure 10:
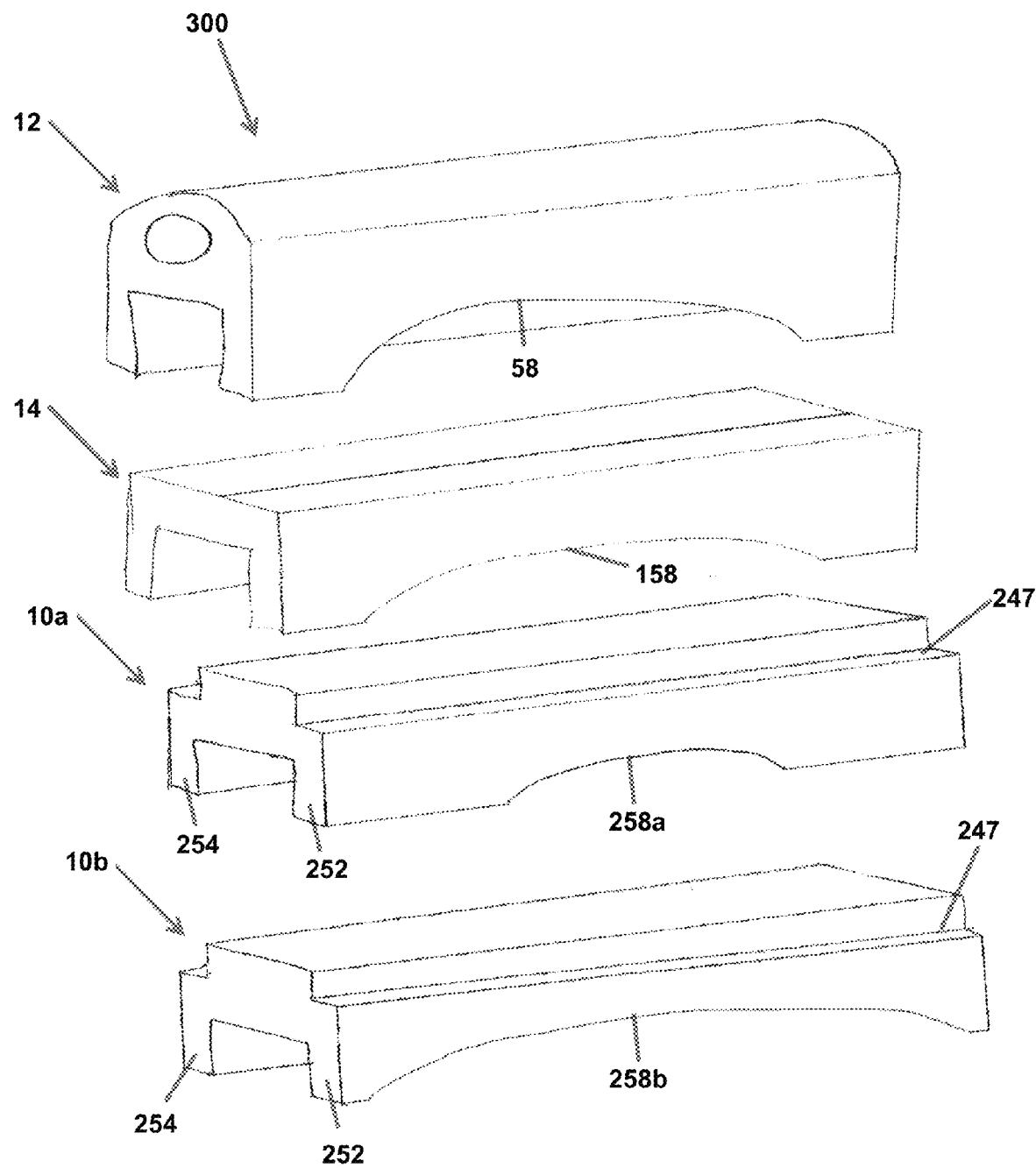
FIG. 10 is a perspective view of one embodiment of a kit for a pulley alignment system having four pieces including two adaptors.

Referring now to FIG. 10, a pulley alignment kit, generally designated 300, is disclosed containing the components to assemble pulley alignment system 8. Kit 300 may include at least one sighting component 12, at least one target component 14, and at least one adaptor 10a, but may include any number of additional adaptors 10b having various mounting surfaces 240 and/or arches 258, where each component conforms with its respective description presented above. Kit 300 may include one or more adaptors 10a, 10b, each with different pulley attachment characteristics, but each with uniform receiving surface 247 characteristics to receive sighting component 12 and/or target component 14.

Each adaptor 10a, 10b may have a differently shaped arch 258 (as depicted, 258a, 258b) to correspond with a different pulley 18, 22, of a pre-selected diameter. Further, arch 258a, 258b of adaptor 10a, 10b may have a different diameter than arch 58 of sighting component 12 and/or arch 158 of target component 14. Further, arch 58 and arch 158 may have the same or different diameters. For example, adaptor 10a has an arch 258a with a diameter that is smaller than that of both arches 58, 158, and adaptor 10b has an arch 258b with a diameter larger than that of both arches 58, 158.

As an alternative or in conjunction with a kit 300 including adaptors 10a, 10b with varying arches 258a, 158b, kit 300 may further include adaptors 10a, 10b with legs 252, 254 spaced at various distances to accommodate pulleys 18, 22 with rib placement that differs from SAE standard J1459.

A user may use kit 300 to measure the alignment of two pulleys 18, 22, by selecting the appropriate adaptors 10a, 10b with arches 258a, 258b that correspond with the pulleys 18, 22, attaching the selected adaptors 10a, 10b to detachably interface with belt engagement surfaces 16, 20 of pulleys 18, 22, and then detachably interfacing sighting component 12 and target component 14 upon receiving surfaces 247 of adaptors 10a, 10b. If arch 58 of sighting component 12 or arch 158 of target component 14 is compatible with the diameter of pulley 18 or pulley 22, and there are no obstruction to the line of sight between sighting component 12 and target component 14, then adaptor 10a, 10b may be omitted and the compatible component may be detachably affixed directly to the appropriate pulley 18, 22.

Although various aspects of the disclosed pulley alignment system have been shown and described, modifications may occur to those skilled in the art upon reading the specification. The present application includes such modifications and is limited only by the scope of the claims.

What is claimed is:

1. A pulley alignment apparatus comprising:
    a target component or a sighting component having a first contact surface shaped to detachably interface with a first pulley having a first diameter; and
    an adaptor comprising:
        a second contact surface shaped to detachably interface with the first pulley or a second pulley having a second diameter; and
        a receiving surface shaped to detachably interface with the first contact surface of the target component or the sighting component;
    wherein the target component or the sighting component is seated on the adaptor with the first contact surface detachably interfaced with the receiving surface of the adaptor; and
    wherein the first diameter and the second diameter are different.

2. The pulley alignment apparatus of claim 1, wherein the target component or the sighting component include a first retaining mechanism positioned therein to detachably affix the first contact surface, separately, to the adaptor or the first pulley; and the adaptor includes a second retaining mechanism positioned to detachably affix the second contact surface to the second pulley.

3. The pulley alignment apparatus of claim 1, wherein the sighting component includes a laser.

4. The pulley alignment apparatus of claim 3, wherein the sighting component further comprises a contact switch that turns the laser on when seated on the receiving surface of the adaptor or on the first pulley.

5. The pulley alignment apparatus of claim 4, wherein the adaptor includes an activator movable to contact the contact switch when the adaptor is positioned on the second pulley.

6. The pulley alignment apparatus of claim 5, wherein the activator includes a rod extending through the adaptor and having a first end extending beyond the second contact surface, wherein the rod is movable in response to placement of the adaptor on the second pulley.

7. An adaptor for a pulley alignment apparatus comprising:
    an elongated body having two elongate, opposing sides and an activator for engaging a switch on the pulley alignment apparatus;
    a receiving surface extending between the two elongate, opposing sides, the receiving surface comprising an at least partially female receptacle and a first retaining mechanism for detachably connecting a component of the pulley alignment apparatus thereto with a male member received in the at least partially female receptacle; and a mounting surface opposite the receiving surface, the mounting surface comprising legs mateable to an arcuate surface of a pulley and a second retaining mechanism to detachably connect the adaptor to the pulley.

8. The adaptor of claim 7, wherein the receiving surface further comprises a head protruding upward therefrom, wherein the head defines at least one wall of the partially female receptacle.

9. The adaptor of claim 8, wherein the first retaining mechanism is included in the head.

10. The adaptor of claim 8, wherein the partially female receptacle comprises a pair of shoulders positioned on opposite sides of the head.

11. An adaptor for a pulley alignment apparatus comprising:
    an elongated body having two elongate, opposing sides;
    a receiving surface extending between the two elongate, opposing sides, the receiving surface comprising an at least partially female receptacle and a first retaining mechanism for detachably connecting a component of the pulley alignment apparatus thereto with a male member received in the at least partially female receptacle;
    a mounting surface opposite the receiving surface, the mounting surface comprising legs mateable to an arcuate surface of a pulley and a second retaining mechanism to detachably connect the adaptor to the pulley; and
    a bore extending through the adaptor from the receiving surface to the mounting surface; and
    a rod positioned in the bore, wherein the rod is movable between an unengaged position and a pulley-engaged position, wherein, in the pulley-engaged position, contact between the pulley and the rod moves the rod a distance to protrude beyond the receiving surface.

12. A pulley alignment kit comprising:
    a target component detachably connectable to a first pulley;
    one or more adaptors each detachably connectable to pulleys of different diameters;
    a sighting component independently connectable to a second pulley and connectable to each of the one or more adaptors,
    wherein the sighting component includes a laser and a first retaining mechanism positioned therein to detachably affix the sighting component to a second pulley or to the adaptor;
    wherein the adaptors each comprise:
      a contact surface shaped to detachably interface with a pulley of a pre-selected diameter; and
      a receiving surface shaped to detachably interface with the target component, the sighting component, or both the target component and the sighting component.

13. The kit of claim 12, wherein each of the one or more adaptors includes a mating retaining mechanism in the receiving surface positioned to mate with the first retaining mechanism in the sighting component.

14. The kit of claim 12, wherein the sighting component further comprises a contact switch that turns the laser on when seated on the receiving surface of one of the adaptors or on the second pulley.

15. The kit of claim 14, wherein the adaptor includes an activator movable to contact the contact switch when the adaptor is positioned on the second pulley.

16. The kit of claim 15, wherein the activator includes a rod extending through the adaptor and having a first end extending beyond the second contact surface, wherein the rod is movable in response to placement of the adaptor on the second pulley.

17. A pulley alignment apparatus comprising:
    a target component and a sighting component both having a first contact surface shaped to detachably interface with a first pulley having a first diameter; and
    an adaptor comprising:
      a second contact surface shaped to detachably interface with a second pulley having a second diameter; and
      a receiving surface detachably interfaced with the target component or the sighting component;
    wherein the target component or the sighting component is seated on the adaptor with the first contact surface detachably interfaced with the receiving surface of the adaptor as an alternative to being seated on the first pulley.

18. The pulley alignment apparatus of claim 17, wherein the target component comprises:
    an elongated body having opposing sidewalls;
    an upper surface extending between the opposing sidewalls and having indicia thereon that identifies a target for the sighting component to align with;
    a mounting surface opposite the upper surface;
    a pair of legs extending from the mounting surface for engagement with a pulley.

19. The pulley alignment apparatus of claim 18, wherein the sighting component comprises:
    an elongated body having opposing sidewalls;
    an upper surface extending between the opposing sidewalls;
    a mounting surface opposite the upper surface;
    a pair of legs extending from the mounting surface for engagement with a pulley;
    a laser that projects at least two points within a plane housed within the elongated body;
    an on-board power supply to power the laser; and
    a contact switch to activate the on-board power when the sighting component is seated on the first pulley or on the adaptor.

20. The pulley alignment apparatus of claim 19, wherein the sighting component further comprises a retaining mechanism as part of the mounting surface or the legs to detachably retain the sighting component against the first pulley or the adaptor.

21. The pulley alignment apparatus of claim 19, wherein the adaptor comprises a head protruding upward from the receiving surface, the head and receiving surface defining a pair of shoulders on opposite sides of the head.

22. The pulley alignment apparatus of claim 21, wherein when the target component or the sighting component is seated on the adaptor, the head of the adaptor interposes the pair of legs thereof.

23. The pulley alignment apparatus of claim 19, wherein the pair of legs on each of the target component, the sighting component, and the adaptor terminate in tips that each have a rounded side and a beveled side and a rounded end therebetween.

24. The pulley alignment apparatus of claim 17, wherein the adaptor further comprises a bore extending from the receiving surface to the mounting surface and a rod positioned in the bore, wherein the rod is movable between an unengaged position and a pulley-engaged position, wherein, in the pulley-engaged position, contact between the pulley and the rod moves the rod a distance to protrude beyond the receiving surface.

* * * * *